United States Patent [19]

Kiyoura et al.

[11] Patent Number: 4,922,476
[45] Date of Patent: May 1, 1990

[54] PLAYING METHOD FOR DISK PLAYER

[75] Inventors: Kazuhiro Kiyoura; Fumio Endo; Toshiyuki Kimura; Yoshio Aoyagi; Kazunari Nakamura, all of Saitama, Japan

[73] Assignee: Pioneer Electronic Corporation, Tokyo, Japan

[21] Appl. No.: 312,155

[22] Filed: Feb. 21, 1989

Related U.S. Application Data

[62] Division of Ser. No. 103,314, Oct. 1, 1987, Pat. No. 4,841,506.

[30] Foreign Application Priority Data

Oct. 1, 1986 [JP] Japan ................................. 61-233723
Oct. 1, 1986 [JP] Japan ................................. 61-233724
Oct. 1, 1986 [JP] Japan ................................. 61-233725
Oct. 1, 1986 [JP] Japan ................................. 61-233726
Oct. 1, 1986 [JP] Japan ................................. 61-233727
Oct. 1, 1986 [JP] Japan ................................. 61-233728

[51] Int. Cl.$^5$ .......................... G11B 7/00; G11B 7/095
[52] U.S. Cl. ......................................... 369/47; 369/32; 369/33; 369/54; 369/100; 360/69
[58] Field of Search ..................... 369/32, 33, 47, 100, 369/53, 54, 124; 360/69, 137

[56] References Cited

U.S. PATENT DOCUMENTS

| 4,488,277 | 12/1984 | McFarlane et al. | 369/54 |
| 4,538,257 | 8/1985 | Klinger | 369/107 |
| 4,796,250 | 1/1989 | Kobayashi et al. | 369/278 |
| 4,841,506 | 6/1989 | Kiyoura et al. | 369/34 |

FOREIGN PATENT DOCUMENTS

| 59-42653 | 3/1984 | Japan | 369/275 |
| 60-160082 | 8/1985 | Japan | 369/292 |
| 61-180935 | 8/1986 | Japan | 369/48 |

Primary Examiner—Steven L. Stephan
Attorney, Agent, or Firm—Sughrue, Mion, Zinn, Macpeak & Seas

[57] ABSTRACT

The invention provides an improved playing method for a CD (compact disk) player whereby the same selection is inhibited from being played twice in a row. Also, disks and selections more in accordance with the user's preference are played more frequently. Volume and other playing characteristics are automatically adjusted for each disk in accordance with stored values corresponding to manual adjustments made the first time the disk was played.

2 Claims, 13 Drawing Sheets

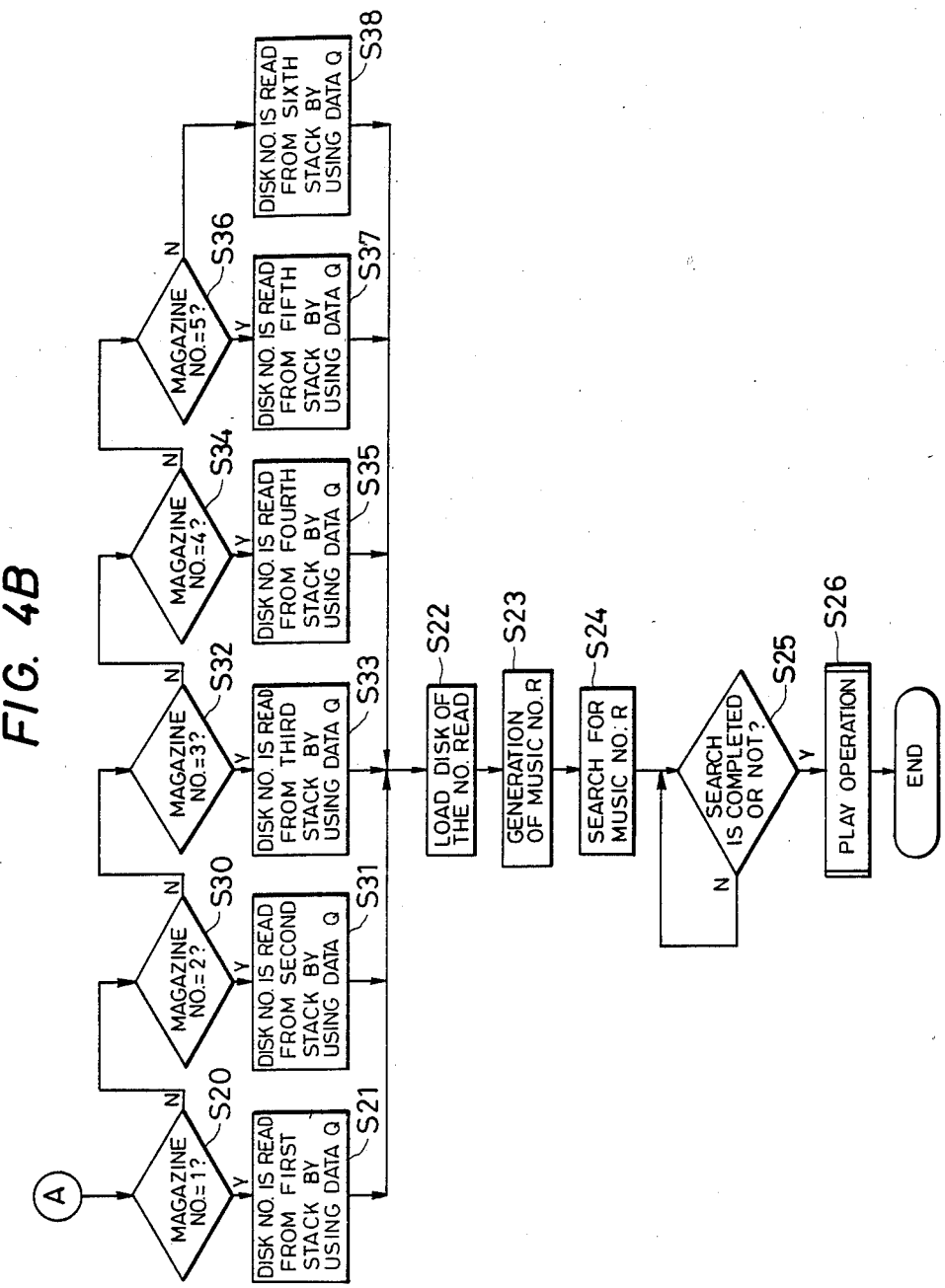

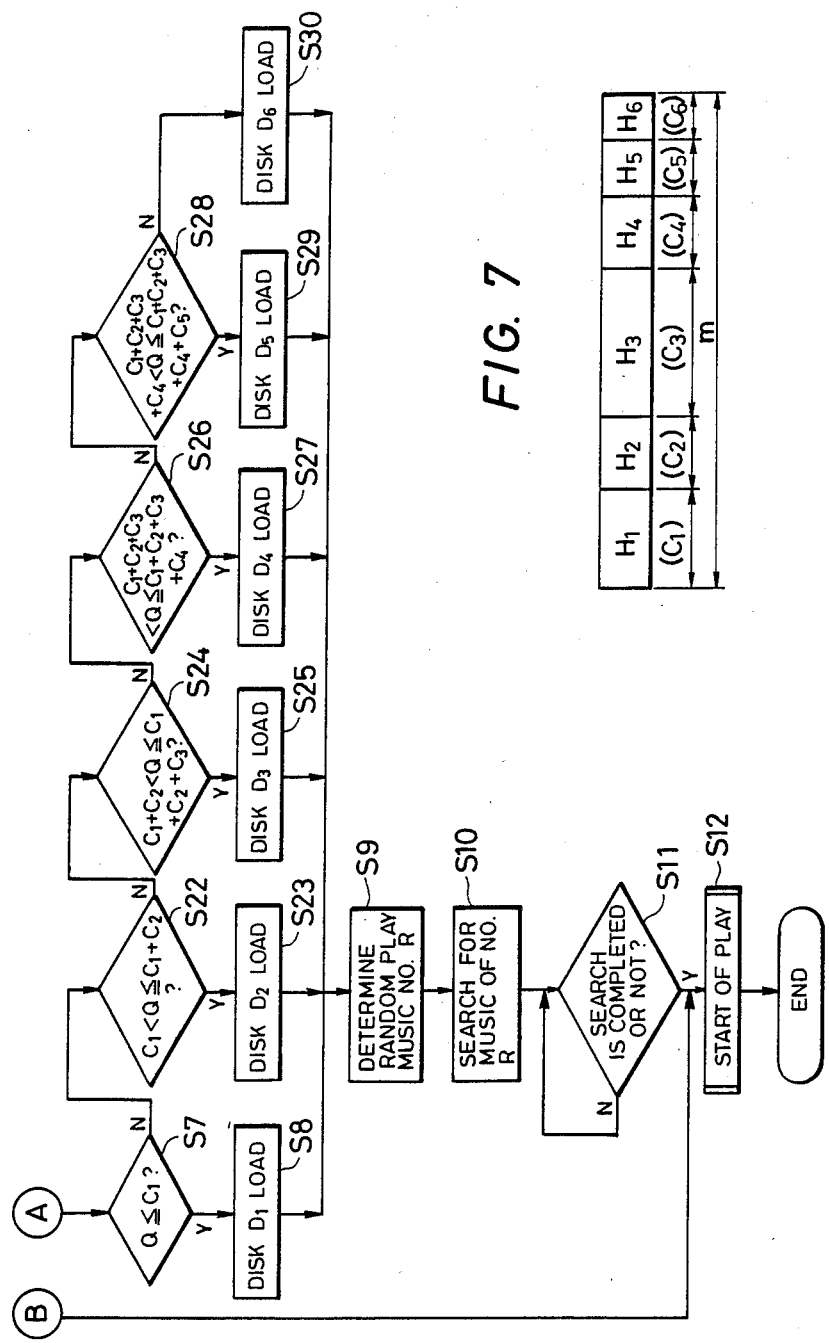

PLAYING METHOD FOR DISK PLAYER

This is a Division of application Ser. No. 07/103,314 filed Oct. 1, 1987, now U.S. Pat. No. 4,841,506.

BACKGROUND OF THE INVENTION

The present invention relates to a random playing method for a disk player.

Random playing methods for disk players are known wherein music selections recorded on a digital audio disk can be played in a random order based upon a set of random numbers generated internally of the player. Such a conventional random playback method is disadvantageous, however, in that sometimes the same piece of music may mistakenly be played two or three times in a row.

As a result, there has developed a demand for a method wherein playing of the same musical selection two or more times continuously is inhibited. These systems though suffer from other drawbacks in that when the number of recorded pieces of music is two or three, the playing order is invariant.

Also, there has been devised a random playing method for a multidisk player holding a plurality of disks wherein one of the pieces of music is selected in accordance with random numbers to play the various pieces of music successively in an order chosen randomly. However, the disadvantage of such a random playback system is that, because the selection of music is made independently of the user's choice, music according to the user's preference may not be played even for several hours.

Furthermore, conventional random playback methods are disadvantageous in that the interval between pieces of music is lengthened owing to the fact that, because the operation of replacing one disk with another is conducted each time a new piece of music is played, even when adjacent selections are on the same disk.

Further, the recording levels of disks such as digital audio disks are not necessarily uniform and may vary among manufacturers. In a conventional disk player, adjustment of playing characteristics such as the playback volume must be manually made by the user. A problem thus exists in that the volume must be manually set each time a new disk is played.

SUMMARY OF THE INVENTION

An object of the present invention is thus to provide a random playing method for a disk player wherein the same piece of music is prevented from being played two or more times in a row and without imparing the variability of the selection order.

In the random playback method for a disk player according to one aspect of the present invention, the number of data groups recorded on a recording disk is detected and, when conformity is established between present and preceding numerical values obtained through randomly generation, the corresponding data group is inhibited from being played back, provided the number thus detected is greater than a predetermined value.

A further object of the present invention is to provide a random playing method implementing random playback with a greater probability of music being chosen according to the user's preference.

The random playing system of a multidisk player according to this object of the present invention is characterized in that data indicating recording disks which have been played back out of the disks respectively placed in position are sequentially recorded in a memory having a plurality of positions where the data are stored in order of playback, one of the numerical values respectively corresponding to the plurality of positions where the data are stored is randomly generated in response to a command, and the data recorded on the recording disk indicated by the data stored in the position corresponding to the numerical value thus generated is played back.

Moreover, a random playing method for a multidisk player according to the present invention is characterized in that the number of times each recording disk is replayed is counted and stored, ranges of numerical values differing from each other and corresponding to the disks and depending on the number of times each of the recording disks is replayed are stored in response to a command, one of the numerical values in any one of the ranges of numerical values is randomly generated, and data recorded on a disk corresponding to one of the ranges of numerical values containing the numerical value thus generated is played back.

Still further, a playing method for a multidisk player according to another feature of the present invention is characterized in that ranges of numerical values differing from one another and corresponding to disks loaded for playing are preset, one of the numerical values in any one of the ranges of numerical values is randomly selected, and the data recorded on the disk corresponding to the range of numerical values containing the numerical value thus generated is played back.

Another object of the present invention is to provide a random playing method for a multidisk player capable of shortening the interval between pieces of music being played.

In accordance with this object, in a random playback method for a multidisk player according to the present invention, ranges of numerical values differing from one another and respectively corresponding to recording disks assigned to respective loading locations are preset, the recording disk set in the playing position is detected in response to the command, the corresponding relations of the disks to the ranges of numerical values are changed so that the recording disk detected corresponds to the widest range of numerical value, a numerical value falling in one of the ranges of numerical values is randomly generated, and data recorded on the disk corresponding to the range of numerical values wherein the numerical value thus generated falls is played.

Another object of the present invention is to provide a method for setting playing characteristics in a disk player offering excellent operability.

In a method for setting playing characteristics in a disk player according to the present invention, disk identifying data recorded on a disk loaded in the play position of the player is read when playing characteristics are manually adjusted, an adjusted value of the playing characteristics is stored in a storage position corresponding to the disk identifying data thus read, the disk identifying data of the recording disk loaded in the playing position of the disk player is read, and the playing characteristics are set by means of the adjusted values corresponding to the disk identifying data.

DESCRIPTION OF THE EMBODIMENTS

FIG. 4A and 4B are flowcharts indicating operations of the multidisk player of FIG. 1 in accordance with a second embodiment of the invention;

FIGS. 6A and 6B are a flowchart indicating the operation of the multidisk player of FIG. 1 in accordance with a third embodiment of the invention;

FIG. 7 is a diagram indicating an example of a set range of numerical values;

DESCRIPTION OF THE PREFERRED EMBODIMENTS

Referring now to the accompanying drawings, preferred embodiments of the present invention will be described in detail.

Figure 1:
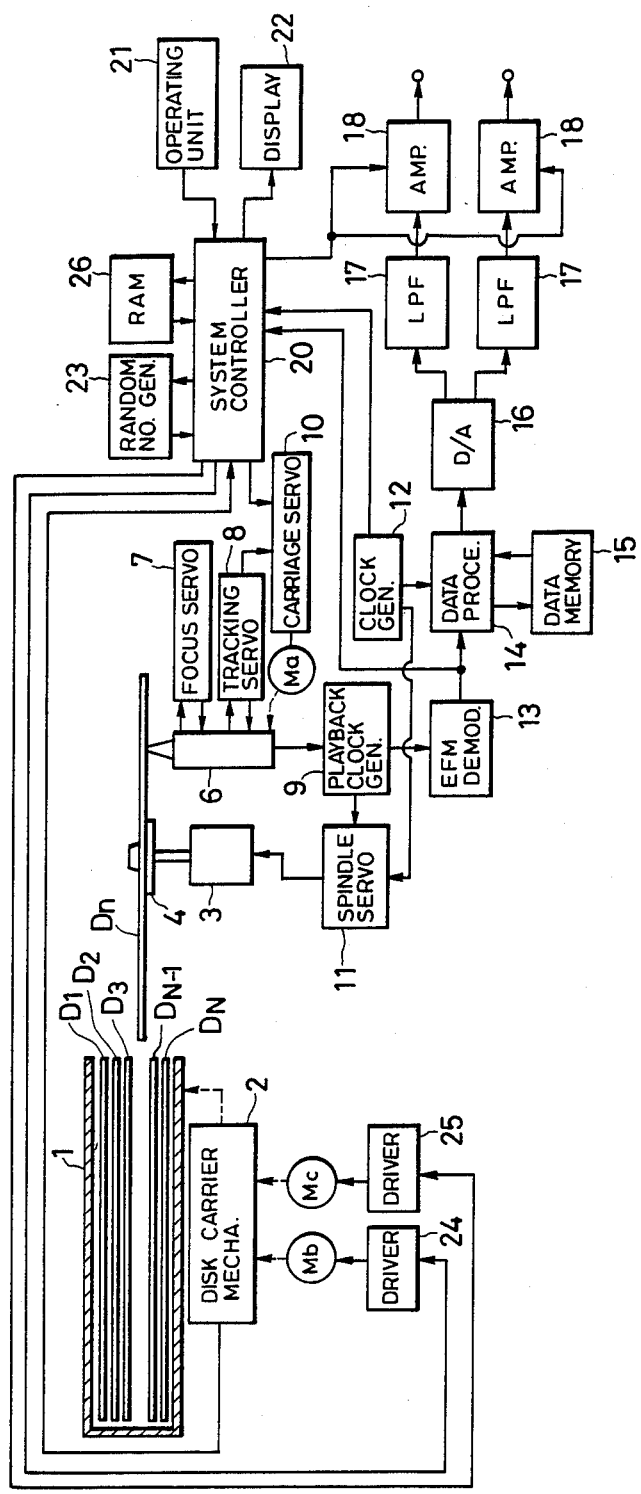
FIG. 1 is a block diagram of a disk player employing a playing method embodying the present invention.

As shown in FIG. 1, a magazine 1 contains N (N represents an integral number greater than 1) disk trays, the trays being projectable from the magazine body and also retractable. The magazine 1 is detachable fitted in position. One of the N disks $D_1$–$D_n$ on the N trays is carried by a disk carrier mechanism onto the disk loading surface of a turntable 4 fixed to the rotary shaft of a spindle motor 3 and the disk there clamped for playing. The disk carrier mechanism 2 includes a projection member for projecting the trays of the magazine 1 and moving the disks onto the disk loading surface of the turntable 4, a clamp mechanism for clamping the disk thus shifted by the projection member to the disk loading surface of the turntable 4, a moving plate for changing the relative position of the projection member with respect to the magazine 1 in the direction of tray arrangement, and a sensor for detecting the position of the moving plate, the operation of the clamp mechanism, etc. The position of the projection member is set by moving the moving plate in the disk carrier mechanism 2, thereby allowing the selection of a disk. A detailed description of the magazine 1 and the disk carrier mechanism can be found in the specification of Japanese patent application No. 153651/85.

The data recorded on the disk $D_n$ extracted by the disk carrier mechanism 3 from the magazine 1 and clamped on the disk loading surface of the turntable 4 is read by an optical pickup 6. The pickup 6 incorporates a laser diode, an objective lens, a focus actuator, a tracking actuator, a photodetector, etc. The output of the pickup 6 is supplied to a focus servo circuit 7, a tracking servo circuit 8, and a playback clock generating circuit 9 including an RF amplifier.

In the focus servo circuit 7, a focus error signal is generated using, e.g., the astigmatic method, and the focus actuator in the pickup 6 is driven in response to the error signal. Consequently, laser beams emitted by a laser diode are focused via the objective lens on the recording face of the disk $D_n$ to form a light spot for data detection. In the tracking servo circuit 8, moreover, a tracking error signal is generated using the push-pull method and applied to the tracking actuator and a carriage servo circuit 10 in the pickup 6. The output of the carriage servo circuit 10 is supplied to a motor $M_a$ for driving a carriage (not shown) supporting the pickup 6 so that the pickup 6 is moved in the radial direction of the disk $D_n$.

A playback clock signal used for demodulation is generated by the playback clock generating circuit 9 and supplied to a spindle servo circuit 11. A driving signal corresponding to the phase difference between the playback clock and a reference clock from a clock generating circuit 12 is generated by the spindle servo circuit 11 and used to drive the spindle motor 3 so that the linear tracking velocity on the disk $D_n$ is made constant. Moreover, the output of the RF amplifier in the playback clock generating circuit 9 is supplied to an EFM demodulating circuit 13 including a frame synchronizing circuit. The demodulated output of the EFM demodulating circuit 13 is processed in a a data processing circuit 14 for de-interleaving the demodulated data signal and detecting and correcting errors therein. Thereafter, the demodulated output is stored in a data memory 15 and then read out in response to the clock signal from the clock signal generating circuit 12 before being converted by a D/A (Digital Analog) converter 16 into an analog signal. The analog signal is applied in the form of left and right audio signals via an LFP (Low-Pass Filter) and an amplifier 18. The amplifier 18 receives a control signal and changes the frequency characteristics of the amplified signal in accordance with this control signal.

A control signal contained in the data from the EFM demodulating circuit 13 is supplied to a system controller 20, including various types of information about the music being played, the interval between pieces of music, the identifying numbers for the various music pieces, their playing time, disk type numbers, etc. The system controller 20 is implemented with one or a plurality of microcomputers, each including a processor, a ROM (Read Only Memory) a RAM (Random Access Memory), an interface circuit and a timer. In the system controller 20, the processor operates according to a program prestored in the ROM and on the basis of the flowchart shown in FIG. 2, processing various detection signals from the disk carrier mechanism 2, data keyboarded through an operating unit 21, and output data from a random number generating circuit 23, and supplier varieties instructions and control data to the carriage servo circuit 10, the spindle servo circuit 11, the amplifier 18, a display 22, and driving circuits 24, 25. The random number generating circuit 23, which is used to latch, e.g., an m (m represents an integral number) shift counter, produces a count which sequentially changes with an extremely short period in response to the data output instructions. In addition, the driving circuits 24, 25 are caused to supply driving currents corresponding to the instructions to motors $M_b$, $M_c$, for respectively driving the moving plate and the projection member in the disk carrier mechanism 2. A RAM 26 in this case stores data from the system controller 20.

Figure 2:
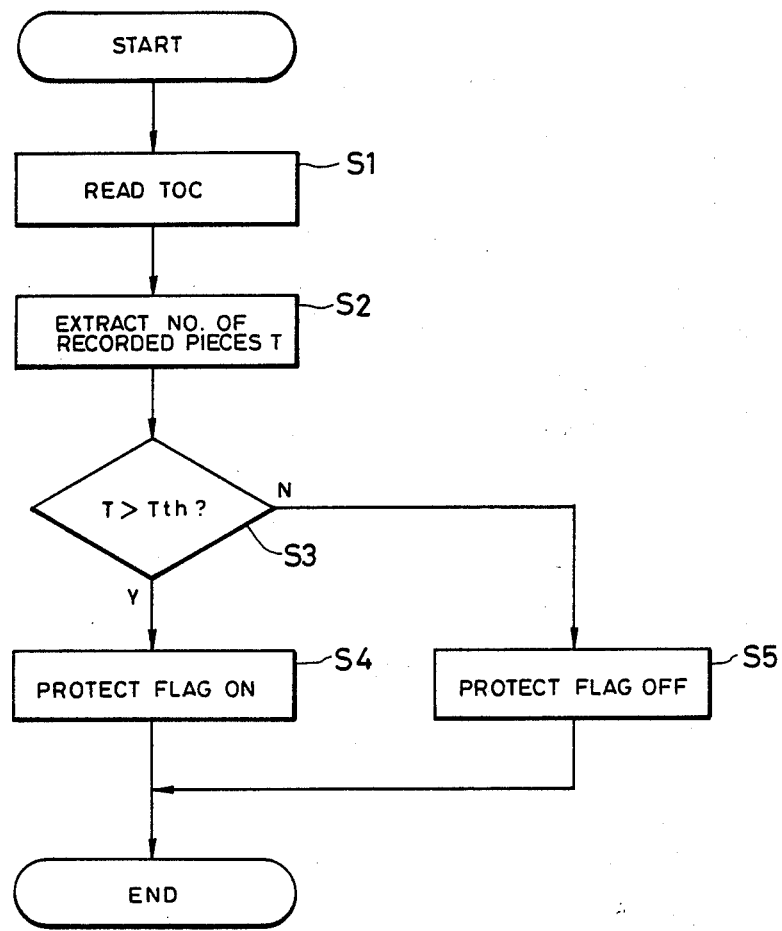
FIG. 2 is a flowchart indicating the operation of the disk player shown in FIG. 1 immediately after a disk is loaded.
Figure 3:
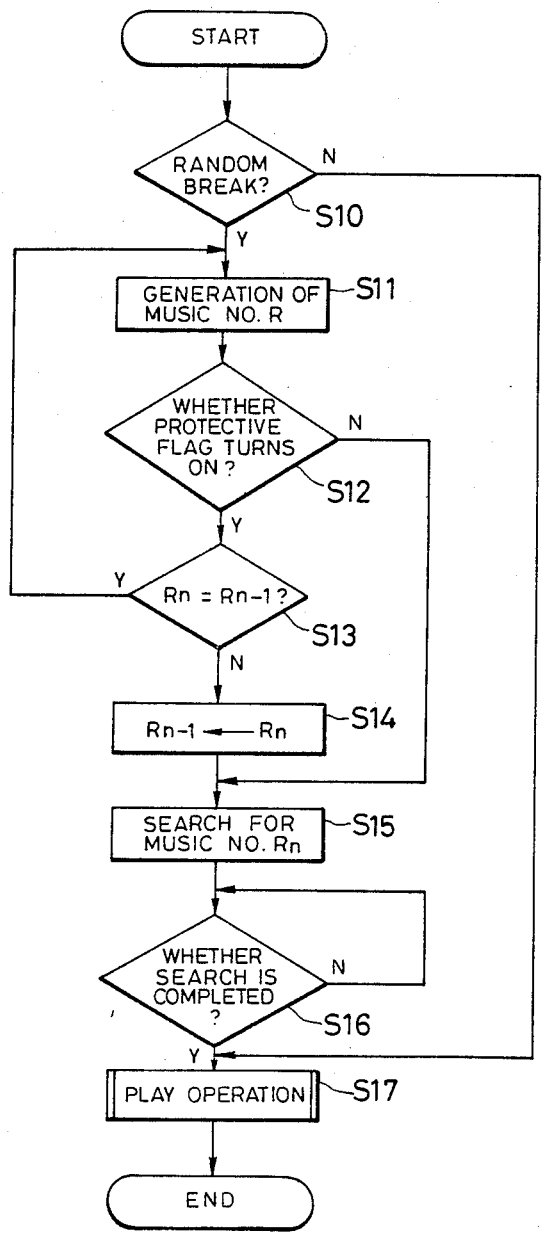
FIG. 3 is a flowchart indicating the operation of the disk player shown in FIG. 1 when a play command is issued.

Referring to the flowcharts in FIGS. 2 and 3, the operation of the processor in the system controller 20 will subsequently be described.

When the output of the sensor for indicating the fact that one of the disks $D_1$-$D_n$ contained in the magazine 1 has been carried and clamped onto the turntable 4 while the main routine is being executed, the processor proceeds to STEP S1 and reads a group of data known as a TOC (Table of Contents) on the disk $D_n$ clamped on the turntable. Subsequently, the processor proceeds to STEP S2, extracts data indicating the number of recorded pieces of music T from the TOC, and stores the data in a register. Then the processor proceeds to STEP S3 and decides whether or not the number of recorded pieces of music T indicated by the data stored in the register is greater than a predetermined value $T_{th}$.

If the number of recorded pieces of music T is greater than the predetermined value $T_{th}$ in STEP S3, the processor proceeds to STEP S4, turns on a protective flag (e.g., sets a 1 as the bit assigned as a flag bit for the data stored at an allocated address M1 of the RAM 26), and restarts implementing the routine carried out immediately prior to the shift to STEP S1, whereas if the number of recorded pieces of music T is not greater than the predetermined value $T_{th}$ in STEP S3, the processor proceeds to STEP S5, turns off the protective flag (e.g., sets to 0 the bit assigned as a flag bit for the data stored at the allocated address M1 of the RAM 26), and restarts implementing the routine carried out immediately prior to the shift to STEP S1.

When a play command keyboarded through the operating unit 21 is detected while the main routine is being executed, the processor proceeds to STEP 10 and decides whether or not a random play command has been issued simultaneously with or immediately after the play command. On deciding that the random play command has been issued in STEP S10, the processor proceeds to STEP S11, sends a data output command to the random number generating circuit 23 to latch the output data therefrom, and determines a music number R for random play from the data thus latched.

The processing in STEP S11 can be achieved as follows: the number of recorded pieces of music is first obtained through computation from the data of starting and closing music numbers in the TOC data (whose value is set at P), and P is repeatedly subtracted from the output data Q to obtain a number q from which the P becomes no longer substractable (i.e., what is left after the division of Q by P). The residual value with the addition of the starting music number becomes the music number R.

Subsequently, the processor proceeds to STEP S12 and decides whether or not the protective flag has been turned on. If the protective flag is held on in STEP S12, the processor proceeds to STEP S13 and decides whether or not the present value $R_n$ of the music number R obtained in STEP S11 conforms to the preceding value $R_{n-1}$ stored in an allocated address $M_2$ of the RAM 26.

If the present value $R_n$ of the music number R conforms to the preceding value $R_{n-1}$ in STEP S13, the processor again proceeds to STEP S11, whereas if the present value $R_n$ of the music number R does not conform to the preceding value $R_{n-1}$, the processor proceeds to STEP S14 and stores the present value $R_n$ as the preceding value $R_{n-1}$ at the allocated address $M_2$ of the RAM 26. Subsequently, the processor proceeds to STEP S15 and searches for the recording position of the music number R determined in STEP S11. Then the processor proceeds to STEP S16 and decides whether or not the search operation has been completed. On deciding that the search operation has not yet been completed in STEP S16, the processor again executes the instruction in STEP S16 and proceeds to STEP S17 only when it determines that the search operation has been completed in order to call in a subroutine for controlling the play operation. The processor restarts executing the main routine after executing the subroutine.

If the protective flag is not held on in STEP S12, the processor immediately proceeds to STEP S15.

On deciding that the random play command has not been issued in STEP S10, the processor immediately proceeds to STEP S17.

When the number of recorded pieces of music T on the disk $D_n$ loaded on the turntable is to be found greater than the predetermined value $T_{th}$ through the aforesaid operations, the protective flag is turned on and when the same music number R is continuously generated, the operation of generating the music number R is again started in STEP S13, so that the same music is prevented from being successively played. When the number of recorded pieces of music on the disk $D_n$ loaded on the turntable is not greater than the predetermined value $T_{th}$, moreover, the protective flag is turned off. Consequently, variability of playing order is not impaired because the operation of generating the music number R is not restarted even if the same music number R is continuously generated.

In the random play method for a disk player according to the present invention as set forth above in detail, the number of data groups or information sections recorded on a recording disk is detected and, when conformity is established between the present and preceding numerical values obtained through the operation of randomly generating one of the numerical values respectively corresponding to the plurality of data groups, the data group corresponding to the numerical value obtained through the operation of generating the numerical value is inhibited from being played, provided the number thus detected is greater than the predetermined value. Accordingly, when the number of recorded pieces of music is greater than the predetermined value, the same piece cannot be continuously played, and when the number of recorded pieces of music is not greater than the predetermined value, the music piece corresponding to the numerical value obtained through the operation of generating the numerical value is played without inhibition, whereby variability in the playing order is not impaired.

Figure 4A:
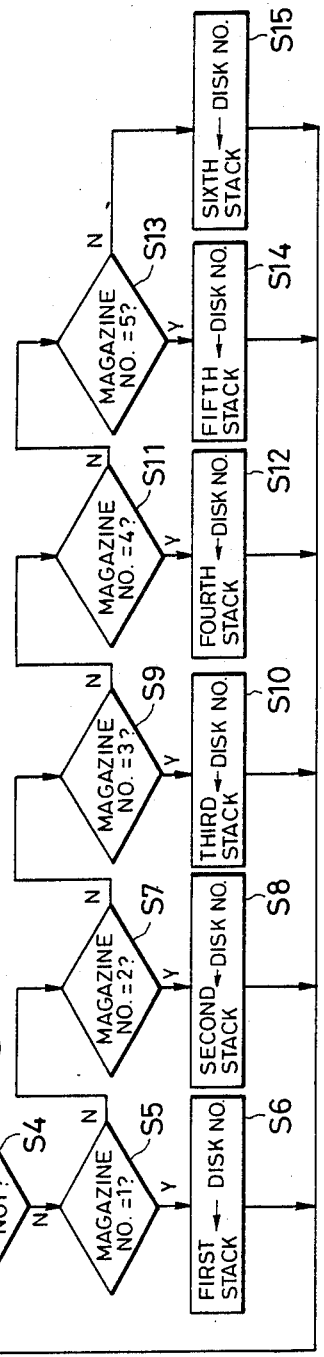
Figure 5:
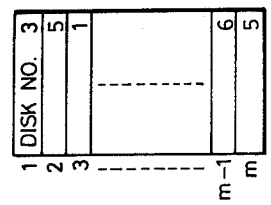
FIG. 5 is a diagram showing an example of storage contents of a stack.

Referring to a flowchart in FIGS. 4A and 4B, a second embodiment of the present invention will now be explained. The operation of the processor in the system controller 20 when N=6, i.e., the number of disks contained in the magazine 1 is six, will subsequently be described.

When a play command is keyboarded through the operating unit 21 during the execution of the main routine, the processor proceeds to STEP S1, detects the number of the magazine then loaded, and stores the number at an address $M_1$ of the RAM 26. Subsequently, the processor proceeds to STEP S2 and issues instructions to the driving circuits 24, 25 according to the sensor output from the disk carrier mechanism 2 so that disk $D_n$ specified at the time of issuance of the play command is carried and clamped onto the turntable 4. Then, the processor proceeds to STEP S3 and stores the disk number assigned to the disk $D_n$ at an address $M_2$ of the RAM 26.

The processor proceeds to STEP S4 and determines whether or not a random play command has been entered and issued through the operating unit 21. On finding that the random play command has not been issued in STEP S4, the processor proceeds to Step S5 and decides whether or not the magazine number stored at the address $M_1$ of the RAM 26 is 1. If the magazine number is 1 in STEP S5, the processor proceeds to STEP S6, stores the disk number at the address $M_2$ of the RAM 26 in a first stack provided in the RAM 26, and proceeds to STEP S2 again.

If the Magazine number stored at the address $M_1$ is not 1 in STEP S5, the processor proceeds to STEP S7 and determines whether or not the magazine number stored at the address $M_1$ is 2. If the magazine number stored at the address $M_1$ is 2 in STEP S7, the processor proceeds to STEP S8, stores the disk number stored at the address $M_2$ in a second stack provided in the RAM 26, and proceeds to STEP S2 again.

If the magazine number stored at the address $M_1$ is not 2 in STEP S7, the processor proceeds to STEP S9 and determines whether or not the magazine number stored at the address $M_1$ is 3. If the magazine number stored at the address $M_1$ is 3 in STEP S9, the processor proceeds to STEP S10, stores the disk number stored at the address $M_2$ in a third stack provided in the RAM 26, and proceeds to STEP S2 again.

If the magazine number stored at the address $M_1$ is not 3 in STEP S9, the processor proceeds to STEP S11 and determines whether or not the magazine number stored at the address $M_1$ is 4. If the magazine number stored at the address $M_1$ is 4 in STEP S11, the processor proceeds to STEP S12, stores the disk number stored at the address $M_2$ in a fourth stack provided in the RAM 26, and proceeds to STEP S2 again.

If the magazine number stored in $M_1$ is not 4, the processor proceeds to STEP 13 and determines whether or not the magazine number stored at the address location $M_1$ is 5. If the magazine number stored at the address location $M_1$ is 5, then the processor proceeds to S14, stores the disk number contained in the address $M_2$ in a fifth stack provided in the RAM 26, and proceeds to STEP 2 again.

If the magazine number stored at $M_1$ is not 5 in STEP S13, then the processor proceeds to STEP S15 and stores the disk number stored at the address location $M_2$ in a sixth stack provided in the RAM 26, and proceeds to STEP S2 again.

On finding that the random play command has been issued in STEP S4, the processor proceeds to STEP S22 and issues instructions to the driving circuits 24, 25 according to the sensor output from the disk carrier mechanism 2, so that a disk with the disk number assigned thereto is carried and clamped onto the turntable 4. Then the processor proceeds to STEP S23, send data output instructions to the random number generating circuit 23 to store the output data, and determines a music number R for random play based on the data thus stored.

The processing in STEP S23 can be achieved as follows: the number of recorded pieces of music is first obtained through computation from the data of starting and closing numbers in the TOC data (whose value is set at P) and P is repeatedly subtracted from output data Q to obtain a number q from which P is no longer substractable (i.e., what is left after the division of Q by P). The residual value with the addition of the starting music number becomes the music number R.

Then the processor proceeds to STEP S24 and searches out the recording position of the music number determined in STEP S23. Then the processor proceeds to STEP S25 and determines whether or not the search operation has been completed. On finding that the search operation has not yet been completed in STEP S25, the processor again executes the instruction in STEP S25 and proceeds to STEP S26 only when it decides that the search operation has been completed in order to call in a subroutine for controlling the play operation. The processor restarts executing the main routine after executing the subroutine.

If the magazine number stored at the address $M_1$ is not 1 in STEP S20, the processor proceeds to STEP S30 and determines whether or not the magazine number stored at the address $M_1$ is 2. If the magazine number stored at the address $M_1$ is 2 in STEP S30, the processor proceeds to STEP S31, send the data corresponding to a data number m, stored in the second stack to the random number generating circuit 23 to cause the counter in the random number generating circuit 23 to operate as a modulo-$m_2$ counter, stores the output data Q of the random number generating circuit 23, reads the disk number stored at the address corresponding to the output data Q in the second stack, and proceeds to STEP S22.

If the magazine number stored at the address $M_1$ is not 2 in STEP S30, the processor proceeds to STEP S32 and determines whether or not the magazine number stored at the address $M_1$ is 3. If the magazine number stored at the address $M_1$ is 3 in STEP S32, the processor proceeds to STEP S33, sends the data corresponding to a data number $m_3$ stored in the third stack to the random number generating circuit 23 to cause the counter in the random number generating circuit 23 to operate as a modulo-$m_2$ counter, stores the output data Q of the random number generating circuit 23, reads the disk number stored at the address corresponding to the output data Q in the third stack, and proceeds to STEP S22.

If the magazine number stored at the address $M_1$ is not 3 in STEP S32, the processor proceeds to STEP S34 and determines whether or not the magazine number stored at the address $M_1$ is 4. If the magazine number stored at the address $M_1$ is 4 in STEP S34, the processor proceeds to STEP S35, send the data corresponding to a data number $m_4$ stored in the fourth stack to the random number generating circuit 23 to cause the counter in the random number generating circuit 23 to operate as a modulo-$m_4$ counter, stores the output data Q of the random number generating circuit 23, reads the disk number stored at the address corresponding to the output data Q in the fourth stack, and proceeds to STEP S22.

If the magazine number stored at the address $M_1$ is not 4 in STEP S34, the processor proceeds to STEP S36 and determines whether or not the magazine number stored at the address $M_1$ is 5. If the magazine number stored at the address $M_1$ is 5 in STEP S36, the processor proceeds to STEP S37, sends the data corresponding to a data number $m_2$ stored in the fifth stack to the random number generating circuit 23 to cause the counter in the random number generating circuit 23 to operate as a modulo-$m_2$ counter, stores the output data Q of the random number generating circuit 23, reads the disk number stored at the address corresponding to the output data Q in the fifth stack, and proceeds to STEP S22.

If the magazine number stored at the address $M_1$ is not 5 in STEP S36, the processor proceeds to STEP S38, sends the data corresponding to a data number $m_2$ stored in the sixth stack to the random number generating circuit 23 to cause the counter in the random number generating circuit 23 to operate as a modulo-$m_2$ counter, stores the output data Q of the random number generating circuit 23, reads the disk number stored at the address corresponding to the output data Q in the sixth stack, and proceeds to STEP S22.

With the aforesaid operations, the disk numbers of the disks that have been replayed out of the disks $D_1$–$D_n$ respectively contained in the corresponding positions of the magazine are successively stored in the first to sixth stacks in the order of playback. Accordingly, the number of recording positions where the disk numbers of the disks frequently replayed, i.e., the disks containing the user's favorite pieces of music, tends to become greater. As a result, the probability is high of disks containing the user's favorite pieces of music being chosen. Therefore, random playback with a greater probability of music being chosen according to the user's preference is realized.

Although the number of stacks in the aforesaid embodiment has been referred to as six, any number may be employed.

In the random play system of a multidisk player according to this embodiment of the present invention, data indicating recording disks which have been played among the disks respectively placed in position are sequentially recorded in a memory having a plurality of positions where the data are stored in order of playback, numerical values respectively corresponding to the plurality of positions where the data are stored are randomly generated in response to a command, and further the data recorded on the recording disks indicated by the data stored in the positions corresponding to the numerical values thus generated are played back. Accordingly, the probability is high of disks frequently replayed being chose, i.e., disks containing the user's favorite pieces of music. Therefore, random playback but with a greater probability of music being chosen according to the user's preference is realized.

Referring to the flowchart of FIGS. 6A and 6B, the operation of the processor in the system controller 20 in accordance with a third embodiment of the invention will now be described. It is assumed that N=6, that is, that the number of disks contained in the magazine 1 is six.

When a play command is keyboarded through the operating unit 21 during the execution of the main routine, the processor proceeds to STEP S1 and issues instructions to the driving circuits 24, 25 according to a sensor output from the disk carrier mechanism 2 so that a disk $D_n$ specified at the time of issuance of the play command is carried and clamped on the turntable 4. Subsequently, the processor proceeds to STEP S2 and determines whether or not the disk number of the disk $D_n$ clamped on the turntable 4, i.e., the number assigned to each of the disks respectively loaded in the six positions, is 1. If the disk number is 1 in STEP S2, the processor proceeds to STEP S3 and adds a predetermined value to an address $C_1$ of the RAM 26.

The processor next proceeds to STEP S4 and determines whether or not a random play command has been keyboarded and issued through the operating unit 21. On finding that a random play command has been issued in STEP S4, the processor proceeds to STEP S5 and sends data indicating a value m obtained by adding the contents of each of the addresses $C_1$–$C_5$ of the RAM 26 to the random number generating circuit 26 to cause the counter to operate as a modulo-m counter. Then the processor proceeds to STEP S6 and sends a data output instruction to the random number generating circuit 23 to store the output data Q of the random number generating circuit 23. The processor further proceeds to STEP S7 and determines whether or not a value corresponding to the output data Q is present within a range $H_1$ of $C_1$ or less. If the value corresponding to the output data Q is present within the range $H_1$ is STEP S7, the processor proceeds to STEP S8 and issues instructions to the driving circuits 24, 25 in accordance with the sensor output from the disk carrier mechanism 2 to cause a disk $D_1$ with the disk number 1 assigned thereto to be carried and clamped onto the turntable 4.

Then the processor proceeds to STEP S9, sends data output instructions to the random number generating circuit 23 to store the output data, and determines a music number R of music for random play based on the data thus stored. The processing in STEP S9 can be achieved as follows: the number of recorded pieces of music is first obtained through computation from the data of starting and closing music numbers in the TOC data (whose value is set at P) and P is repeatedly subtracted from the output data Q to obtain an number q from which the P is no longer substractable (i.e., what is left after the division of Q by P). The residual value with the addition of the starting music number becomes the music number R.

The processor proceeds to STEP S10 and searches for the recording position of the music number determined in STEP S9. Then the processor proceeds to STEP S11 and determines whether or not the search operation has been completed. On deciding that the search operation has not yet been completed in STEP S11, the processor again executes the instruction in STEP S11 and proceeds to STEP S12 only when it decides that the search operation has been completed in order to call in a subroutine for controlling the play operation. The processor restarts executing the main routine after executing the subroutine.

If the disk number is not 1 in STEP S2, the processor proceeds to STEP S13 and determines whether or not the disk number is 2. If the disk number is 2 in STEP S13, the processor proceeds to STEP S14, adds the predetermined value to the contents of the address $C_2$ of the RAM 26, and proceeds to STEP S4.

If the disk number is not 2 in STEP S13, the processor proceeds to STEP S15 and determines whether or not the disk number is 3. If the disk number is 3 in STEP S15, the processor proceeds to STEP S16, adds the predetermined value to the contents of the address $C_3$ of the RAM 26, and proceeds to STEP S4.

If the disk number is not 3 in STEP S15, the processor proceeds to STEP S17 and determines whether or not the disk number is 4. If the disk number is 4 in STEP S17, the processor proceeds to STEP S18, adds the predetermined value to the contents of the address $C_4$ of the RAM 26, and proceeds to STEP S4.

If the disk number is not 4 in STEP S17, the processor proceeds to STEP S19 and determines whether or not the disk number is 5. If the disk number is 5 in STEP S19, the processor proceeds to STEP S20, adds the predetermined value to the contents of the address $C_5$ of the RAM 26, and proceeds to STEP S4. Moreover, if the disk number is not 5 in STEP S19, the processor proceeds to STEP S21, adds the predetermined value to the contents of the address $C_6$, and proceeds to STEP S4.

On determining that the random play command has not been issued to STEP S4, the processor proceeds to STEP S12.

If no numerical value corresponding to the output data Q is present within the range $H_1$ in STEP S7, the processor proceeds to STEP S22 and determines whether or not the numerical value corresponding to the output data Q is present within a range $H_2$ of greater than $C_1$ and less than $C_1+C_2$. If the numerical value corresponding to the output data Q is present within the range $H_2$, the processor proceeds to STEP S23, issues instruction to the driving circuits 24, 25 according to the sensor output from the disk carrier mechanism 2 to cause the disk $D_2$ to be carried and clamped onto the turntable 4, and proceeds to STEP S9.

If no numerical value corresponding to the output data Q is present within the range $H_2$ in STEP S22, the processor proceeds to STEP S24 and determines whether or not the numerical value corresponding to the output data Q is present with a range $H_3$ of greater than $C_1+C_2$ and less than $C_1+C_2+C_3$. If the numerical value corresponding to the output data Q is present within the range $H_3$, the processor proceeds to STEP S25, issues instructions to the driving circuits 24, 25 according to the sensor output from the disk carrier mechanism 2 to cause the disk $D_3$ to be carried and clamped onto the turntable 4, and proceeds to STEP S9.

If no numerical value corresponding to the output data Q is present within the range $H_3$ in STEP S24, the processor proceeds to STEP S26 and determines whether or not the numerical value corresponding to the output data Q is present within a range $H_3$ of greater than $C_1+C_2+C_3$ and less than $C_1+C_2+C_3+C_4$. If the numerical value corresponding to the output data Q is present within the range $H_4$ in STEP S26, the processor proceeds to STEP S27, issues instructions to the driving circuits 24, 25 according to the sensor output from the disk carrier mechanism 2 to cause the disk $D_4$ to be carried and clamped onto the turntable 4, and proceeds to STEP S9.

If no numerical value corresponding to the output data Q is present within the range $H_4$ in STEP S26, the processor proceeds to STEP S28 and determines whether or not the numerical value corresponding to the output data Q is present within a range $H_5$ of greater than $C_1+C_2+C_3+C_4$ and less than $C_1+C_2+C_3+C_4+C_5$. If the numerical value corresponding to the output data Q is present within the range $H_5$ in STEP S28, the processor proceeds to STEP S29, issues instructions to the driving circuits 24, 25 according to the sensor output from the disk carrier mechanism 2 to cause the disk $D_5$ to be carried and clamped onto the turntable 4, and proceeds to STEP S9.

If no numerical value corresponding to the output data Q is present within the range $H_5$ in STEP S28, the processor proceeds to STEP S30, issues instructions to the driving circuits 24, 25 according to the sensor output from the disk carrier mechanism 2 to cause the disk $D_3$ to be carried and clamped onto the turntable 4, and proceeds to STEP S9.

Figure 6A:
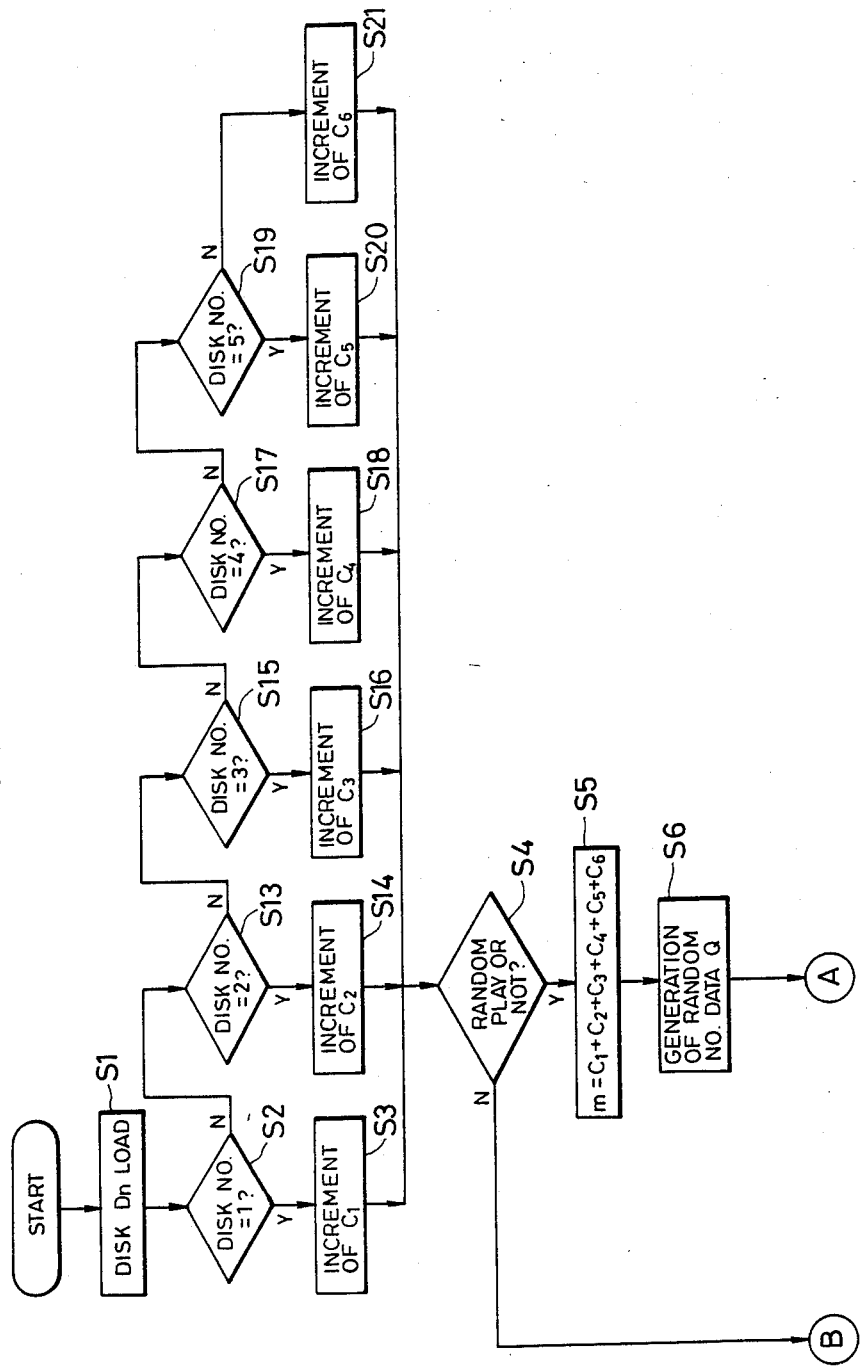

With the aforesaid operations, the ranges of numerical values $H_1$-$H_6$ are respectively set according to the contents of the addresses $C_1$-$C_6$ of the RAM 26 as shown in FIGS. 6A and 6B, and any disk frequently replayed, i.e., a disk containing the user's favorite pieces of music, has a greater corresponding range, so that the probability of such a disk being chosen becomes high. As a result, random playback with a greater probability of music being chosen according to user's preference is realized.

In this random play method for a multidisk player according to this embodiment of the present invention, the number of times each disks is replayed is counted and stored, and ranges of numerical values differing from each other, corresponding to the various disks and depending on the number of times each of the disks is replayed, are stored in response to a command, and further one of the numerical values which is present in any one of the ranges of numerical values is randomly generated, whereby data recorded on a disk corresponding to one of the ranges of numerical values in which the numerical value thus generated is contained is played. Accordingly, the range of numerical values corresponding to frequently played disks is widened with a greater probability of disks being chosen according to user's preference. Therefore, random playback but with a greater probability of the user's favorite music being chosen is carried out.

Figure 8A:
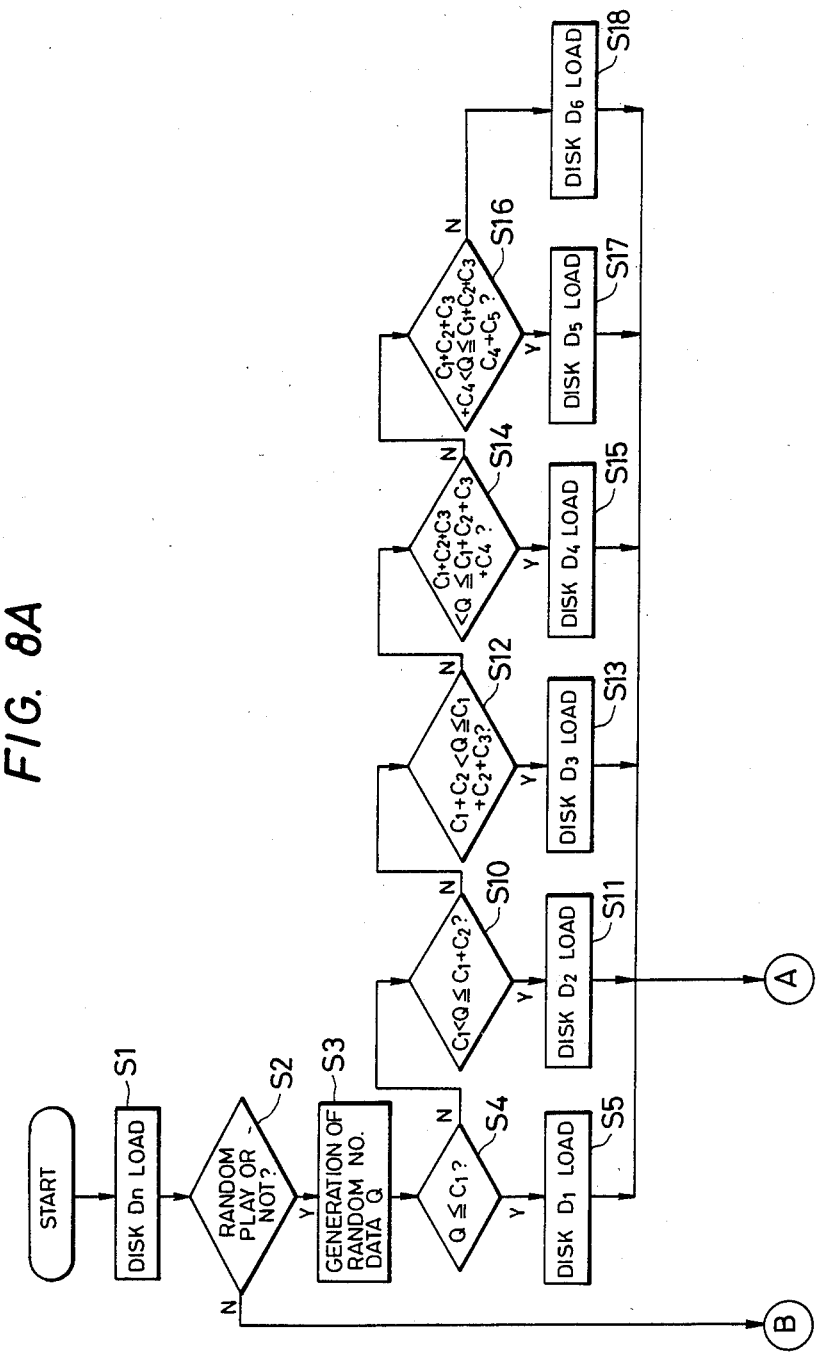
FIG. 8A and 8B are a flowchart indicating the operation of the multidisk player of FIG. 1 in accordance with a fourth embodiment of the invention.
Figure 8B:
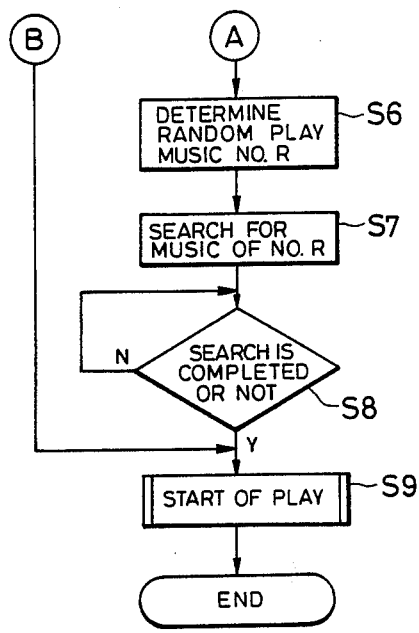

Referring to the flowchart in FIGS. 8A and 8B, a fourth embodiment of the invention will be described. It is again assumed that N=6, that is, that the maximum number of disks which can be loaded in the magazine 1 is six.

When a play command is keyboarded through the operating unit 21 during the execution of the main routine, the processor proceeds to STEP S1 and issues instructions to the driving circuits 24, 25 according to a sensor output from the disk carrier mechanism 2 so that a disk $D_n$ specified at the time of issuance of the play command is carried and clamped on the turntable 4. Subsequently, the processor proceeds to STEP S2 and determines whether or not a random play command has been entered and issued through the operating unit 21. If the random play command is issued in STEP S2, the processor proceeds to STEP S3 and sends a data output instruction to the random number generating circuit 23 to store the thenpresent output data Q of the random number generating circuit 23. Then the processor proceeds to STEP S4 and determines whether or not a numerical value corresponding to the output data Q is present within a range $H_1$ less than $C_1$. If the numerical value corresponding to the output data Q is present within the range $H_1$ in STEP S4, the processor proceeds to STEP S5 and sends instructions to the driving circuits in accordance with the sensor output from the disk carrier mechanism 2 so that the disk $D_1$ is carried and clamped onto the turntable 4.

Then the processor proceeds to STEP S9, sends data output instructions to the random number generating circuit 23 to store the output data, and determines a music number R of music for random play based on the data thus stored. The processing in STEP S6 can be achieved as follows: the number of recorded pieces of music is first obtained through computation from the data of starting and closing music numbers in the TOC data (whose value is set at P) and P is repeatedly subtracted from output data Q to obtain a number q from which P is no longer subtractable (i.e., what is left after the division of Q by P). The residual value with the addition of the starting music number becomes the music number R.

The processor proceeds to STEP S7 and searches the recorded position of the music number determined in STEP S6. Then the processor proceeds to STEP S8 and determines whether or not the search operation has been completed. On deciding that the search operation has not yet been completed in STEP S8, the processor again executes the instruction in STEP S8 and proceeds to STEP S9 only when it decides that the search operation has been completed in order to call in a subroutine for controlling the playing operation. The processor restarts executing the main routine after executing the subroutine.

If the random play command is not issued in STEP S2, the processor instantly proceeds to STEP S9.

If no numerical value corresponding to the output data Q is present within the range $H_1$ in STEP S4, the processor proceeds to STEP S10 and decides whether or not the numerical value corresponding to to the output data Q exists within a range $H_2$ of greater than $C_1$ and less than $C_1+C_2$. If the numerical value corresponding to the output data Q falls within the range $H_2$, the processor proceeds to STEP S11, issues instructions to the driving circuits 24, 25 according to the sensor output from the disk carrier mechanism 2 to cause the disk $D_2$ to be carried and clamped onto the turntable 4, and proceeds to STEP S6.

If no numerical value corresponding to the output data Q is present within the range $H_2$ in STEP S10, the processor proceeds to STEP S12 and determines whether or not the numerical value corresponding to the output data Q is within a range $H_3$ of greater than $C_1+C_2$ and less than $C_1+C_2+C_3$. If the numerical value corresponding to the output data Q falls within the range $H_3$, the processor proceeds to STEP S13, issues instructions to the driving circuits 24, 25 according to the sensor output from the disk carrier mechanism 2 to cause the disk $D_3$ to be carried and clamped onto the turntable 4, and proceeds to STEP S6.

If no numerical value corresponding to the output data Q is present within the range $H_3$ in STEP S24, the processor proceeds to STEP S14 and determines whether or not the numerical value corresponding to the output data Q is within a range $H_4$ of greater than $C_1+C_2+C_3$ and less than $C_1+C_2+C_3+C_4$. If the numerical value corresponding to the output data Q is within the range $H_4$ in STEP S14, the processor proceeds to STEP S15, sends instructions to the driving circuits 24, 25 according to the sensor output from the disk carrier mechanism 2 to cause the disk $D_4$ to be carried and clamped onto the turntable 4, and proceeds to STEP S6.

If no numerical value corresponding to the output data Q is present within the range $H_4$ in STEP S14, the processor proceeds to STEP S16 and determines whether or not the numerical value corresponding to the output data Q falls within a range $H_3$ of greater than $C_1+C_2+C_3+C_4$ and less than $C_1+C_2+C_3+C_4+C_5$. If the numerical value corresponding to the output data Q is within the range $H_5$ in STEP S16, the processor proceeds to STEP S17, sends instructions to the driving circuits 24, 25 according to the sensor output from the disk carrier mechanism 2 to cause the disk $D_5$ to be carried and clamped onto the turntable 4, and proceeds to STEP S6.

If no numerical value corresponding to the output data Q is present within the range $H_5$ in STEP S16, the processor proceeds to STEP S18, sends instructions to the driving circuits 24, 25 according to the sensor output from the disk carrier mechanism 2 to cause the disk $D_6$ to be carried and clamped onto the turntable 4, and proceeds to STEP S6.

Figure 9:
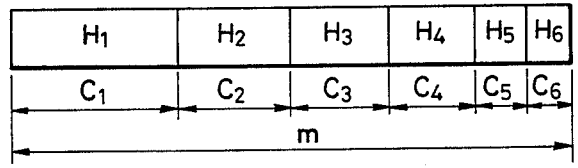
FIG. 9 is a diagram showing an example of setting a range of numerical values.

With the aforesaid operations, as long as the relations among the numerical values $C_1$–$C_6$ in terms of their size are $C_1>C_2>C_3>C_4>C_5>C_6$, the ranges $H_1$–$H_6$ to which the disks $D_1$–$D_6$ respectively correspond are set as shown in FIG. 9 to allow the range $H_1$ to be maximized with the consequent greater probability of the disk $D_1$ being chosen. Accordingly, provided the disk $D_1$, containing pieces of music according to the user's preference, is present in the magazine 1, random playback with a greater probability of music being chosen according to the user's preference is realized.

In the playing system according to the fourth embodiment of the present invention, ranges of numerical values differing from one another and corresponding to recording disks loaded in place are preset, one of the numerical values present in any one of the ranges of numerical values is randomly generated, and the data recorded on the disk corresponding to one of the ranges of numerical values where the numerical value thus generated falls is reproduced. Accordingly, by having disks stored with pieces of music conforming to the user's preference placed in positions corresponding to wider ranges of numerical values by comparison, random playback but with a greater probability of the music being chosen according to user's preference can be implemented.

Figure 10:
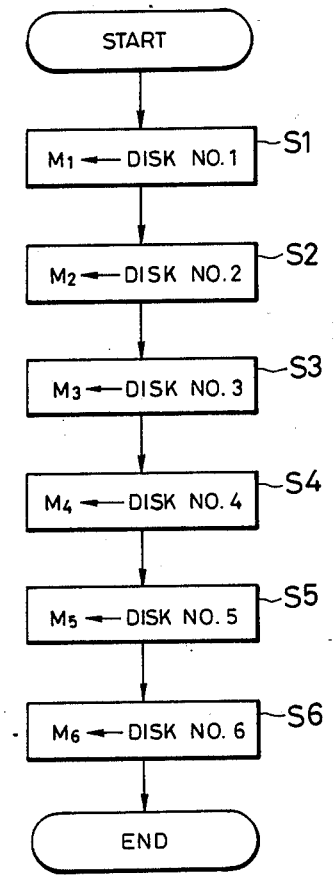
FIG. 10 is a flowchart indicating the operation of the multidisk player of FIG. 1 immediately after power is supplied.
Figure 11A:
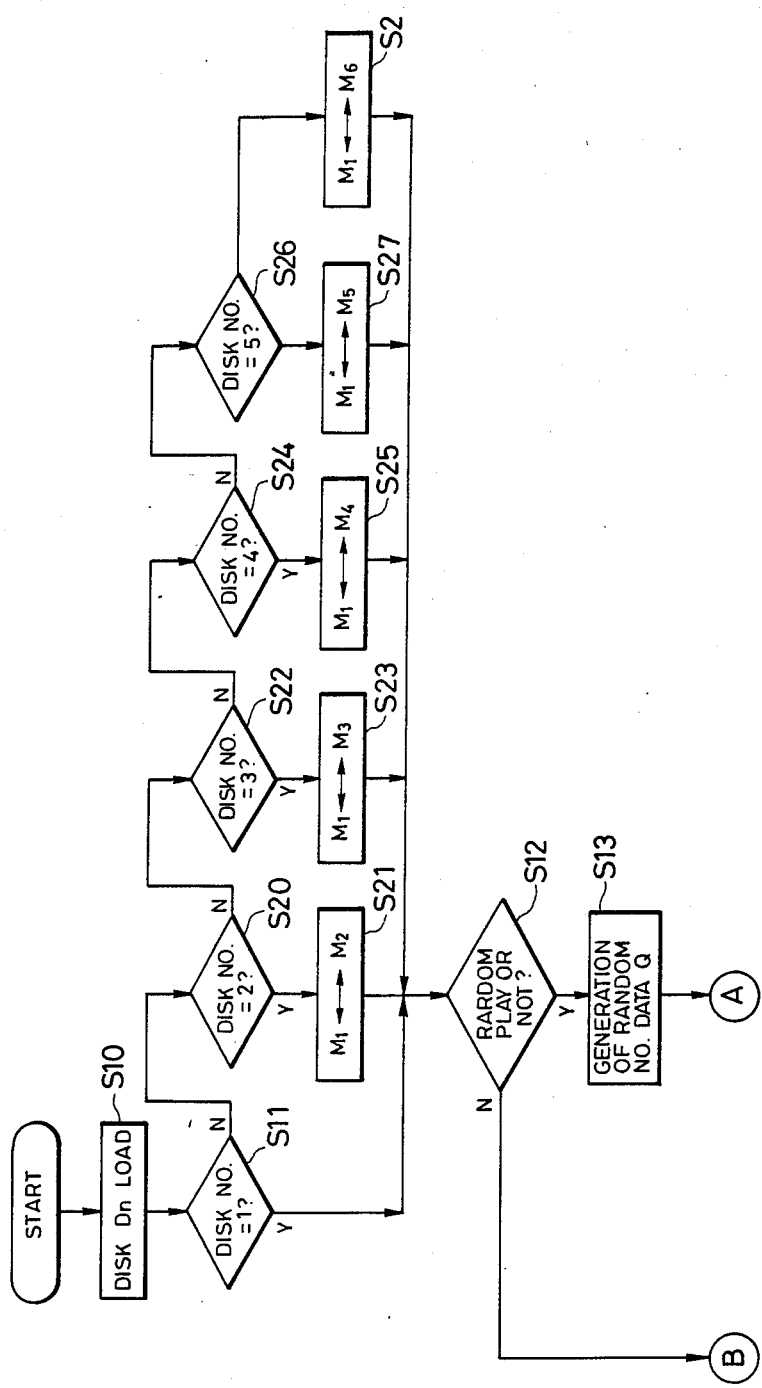
FIGS. 11A and 11B are a flowchart indicating the operation of the multidisk player of FIG. 1 at the time of issuance of a play command in accordance with a sixth embodiment of the invention.
Figure 11B:
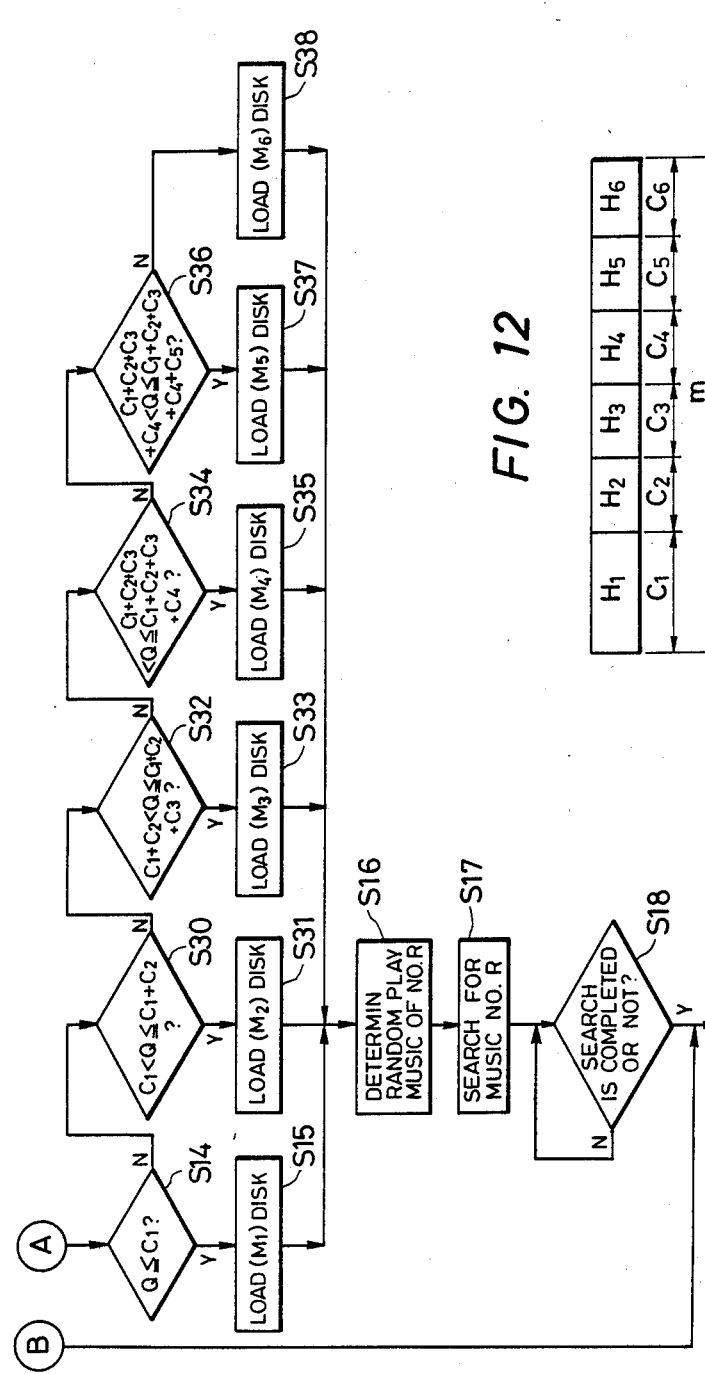
Figure 12:
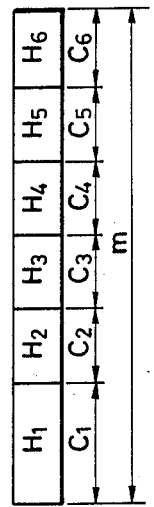
FIG. 12 is a diagram indicating an example of a set range of numerical values.

Referring to the flowcharts of FIGS. 10, 11A and 11B, the operation in accordance with a fifth embodiment of the processor in the system controller 20 when N=6, i.e., the maximum number of disks contained in the magazine 1 is six, will subsequently be described.

The processor proceeds to STEP S1 immediately after power is supplied and writes data indicating a disk number 1 to an address $M_1$ of the RAM 26. Subsequently, the processor proceeds to STEP S2 and writes data indicating a disk number 2 to a disk number 2 to an address $M_2$ of the RAM 26. Then the processor writes data indicating a disk number 3 to an address $M_3$ of the RAM 26 and the data indicating a disk number 4 to an address $M_4$ of the RAM 26. The processor proceeds to STEP S5, writes data indicating a disk number 5 to an address $M_5$ of the Ram 26, and proceeds to STEP S6 and writes data indicating a disk number 6 to an address $M_0$ of the RAM 26.

When a play command is keyboarded and issued through the operating unit 21 during the execution of the main routine, the processor proceeds to STEP S10 and issues instructions to the driving circuits 24, 25 in accordance with the sensor output from the disk carrier mechanism so that the disk specified at the time of issuance of the play command is carried and clamped onto the turntable 4. Subsequently, the processor proceeds to STEP S11 and determines whether or not the disk number of the disk clamped on the turntable 4 is 1.

If the disk number is 1 in STEP s11, the processor proceeds to STEP S12 and determines whether or not a random play command has been entered through the operating unit 21. If a random play command is issued in STEP S12, the processor proceeds to STEP S13 and issues a data output instruction to the random number generating circuit 23 to store the output data Q of the random number generating circuit 23. Then the processor proceeds to STEP S14 and determines whether or not a numerical value corresponding to the output data Q is present within a range of less than $C_1$. If the numerical value corresponding to the output data Q is within the range $H_1$ in STEP S14, the processor proceeds to STEP S15 and issues instructions to the driving circuits 24, 25 in accordance with the sensor output from the disk carrier mechanism 2 so that the disk with the disk number stored at the address $M_1$ assigned thereto is carried and clamped onto the turntable 4.

The processor proceeds to STEP S16 and sends a data output instruction to the random number generating circuit 23 to store the output data of the random number generating circuit 23 and determines a music number R for random play based on the data thus stored. The processing in STEP S16 is achievable as follows: The number of recorded pieces of music is first obtained through computation from the data of starting and closing music numbers in the TOC data (whose value is set at P) and P is repeatedly subtracted from output data Q to obtain a number q from which P is no longer subtractable (i.e., what is left after the division of Q by P). The residual value with the addition of the starting music number becomes the music number R.

The processor proceeds to STEP S17 and searches the recording position of the music determined in STEP S16. Then the processor proceeds to STEP S18 and decides whether or not the search operation has been completed in STEP S18. On determining that the search operation has not yet been completed in STEP S18, the processor executes the instruction in STEP S18 again and, only when the search operation has been completed, proceeds to STEP S19 to call a subroutine for controlling the play operation. The processor restarts executing the main routine after executing the subroutine.

If the disk number is not 1 in STEP S11, the processor proceeds to STEP S20 and determines whether or not the disk number is 2. If the disk number is 2 in STEP S20, the processor proceeds to STEP S21, replaces the contents at the address $M_1$ of the RAM 26 with the contents at the address $M_2$ thereof, and proceeds to STEP S12.

If the disk number is not 2 in STEP S20, the processor proceeds to STEP S22 and determines whether or not the disk number is 3. If the disk number is 3 in STEP S22, the processor proceeds to STEP S23, replaces the contents at the address $M_1$ of the RAM 26 with the contents at the address $M_3$ thereof, and proceeds to STEP S12.

If the disk number is not 3 in STEP S22, the processor proceeds to STEP S24 and determines whether or not the disk number is 4. If the disk number is 4 in STEP S24, the processor proceeds to STEP S25, replaces the contents at the address $M_1$ of the RAM 26 with the contents at the address $M_4$ thereof, and proceeds to STEP S12.

If the disk number is not 4 in STEP S24, the processor proceeds to STEP S26 and determines whether or not the disk number is 5. If the disk number is 5 in STEP S26, the processor proceeds to STEP S27, replaces the contents at the address $M_1$ of the RAM 26 with the contents at the address $M_3$ thereof, and proceeds to STEP S12. If the disk number is not 5 in STEP S26, the processor proceeds to STEP S28, replaces the contents at the address $M_1$ of the RAM 26 with the contents at the address $M_8$ thereof, and proceeds to STEP S12.

If the random command is not issued in STEP S12, the processor instantly proceeds to STEP S19.

Moreover, if no numerical value corresponding to the output data Q is present within the range $H_1$ in STEP S14, the processor proceeds to STEP S30 and determines whether or not the numerical value corresponding to the output data Q is present within the range $H_2$ of greater than $C_1$ but less than $C_1+C_2$. If the numerical value corresponding to the output data Q is within the range $H_2$ in STEP S30, the processor proceeds to STEP S31, sends instructions to the driving circuits 24, 25 in accordance with the sensor output from the disk carrier mechanism 2 to cause the disk with the disk number stored at the address $M_2$ and allotted thereto to be carried and clamped onto the turntable 4, and then proceeds to STEP S16.

If no numerical value corresponding to the output data Q is present within the range $H_2$ in STEP S30, the processor proceeds to STEP S32 and determines whether or not the numerical value corresponding to the output data Q is within the range $H_3$ of greater than $C_1+C_2$ but less than $C_1+C_2+C_3$. If the numerical value corresponding to the output data Q is within the range $H_3$ in STEP S32, the processor proceeds to STEP S33, sends instructions to the driving circuits 24, 25 in accordance with the sensor output from the disk carrier mechanism 2 so that the disk with the disk number stored at the address $M_3$ and assigned thereto is carried and clamped onto the turntable 4, and then proceeds to STEP S16.

If no numerical value corresponding to the output data Q is within the range $H_3$ in STEP S32, the processor proceeds to STEP S34 and determines whether or not the numerical value corresponding to the output data Q is within the range $H_4$ of greater than $C_1+C_2+C_3$ but less than $C_1+C_2+C_3+C_4$. If the numerical value corresponding to the output data Q is within the range $H_4$ in STEP S34, the processor proceeds to STEP S35, sends instructions to the driving circuits 24, 25 in accordance with the sensor output from the disk carrier mechanism 2 to cause the disk with the disk number stored at the address $M_4$ and assigned thereto to be carried and clamped onto the turntable 4, and then proceeds to STEP S16.

If no numerical value corresponding to the output data Q is present within the range $H_4$ in STEP S34, the processor proceeds to STEP S36 and determines whether or not the numerical value corresponding to the output data Q is within the range $H_5$ of greater than $C_1+C_2+C_4$ but less than $C_1+C_2+C_3+C_4+C_5$. If the numerical value corresponding to the output data Q falls within the range $H_5$ in STEP S36, the processor proceeds to STEP S37, sends instructions to the driving circuits 24, 25 in accordance with the sensor output from the disk carrier mechanism 2 so that the disk with the disk number stored at the address $M_5$ and assigned thereto is carried and clamped onto the turntable 4, and then proceeds to STEP S16.

If no numerical corresponding to the output data Q is present within the range $H_5$ in STEP S36, the processor proceeds to STEP S38 and sends instructions to the driving circuits 24, 25 in accordance with the sensor output from the disk carrier mechanism 2 to cause the disk with the disk number stored at the address $M_6$ and assigned thereto to be carried and clamped onto the turntable 4, and then proceeds to STEP S16.

With the aforesaid operations, provided that the numerical value $C_1$ is set greater than any one of $C_2$–$C_8$, the ranges $H_1$–$H_6$ corresponding to the disks having the disk numbers stored at the respective addresses $M_1$–$M_6$ are maximized with the greater probability of such a disk being selected and carried onto the disk table as having the disk number stored at the address $M_1$, i.e., as having already been loaded in the play position. Consequently, the interval between pieces of music to be played is minimized owing to the fact that, because two pieces of music adjacent to each other in playing order are often recorded on the same disk, the operation of replacing one disk with another is minimized.

In the random play system of a multidisk player according to the fifth embodiment of present invention, ranges of numerical values differing from one another and respectively corresponding to recording disks assigned to respective loading locations are preset, the recording disk set in the play position is detected in response to a command, the corresponding relations of the recording disks to the ranges of numerical values are changed so that the recording disk detected corresponds to the widest range of numerical values, a numerical value in the ranges of numerical values is randomly generated, and the data recorded on the disk corresponding to the range of numerical values wherein the numerical value thus generated falls is played back. Accordingly, the probability is high of the recording disk presently loaded in the playing position being selected and the interval between pieces of music minimized owing to the fact that, because two pieces of music adjacent to each other in playing order are often recorded on the same disk, the operation of replacing one disk with another is minimized.

Figure 13:
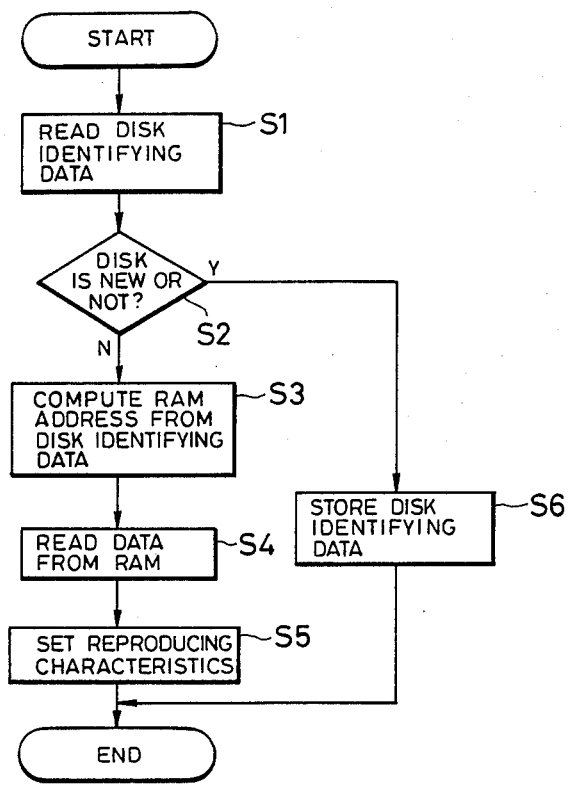
FIG. 13 is a flowchart indicating the operation of the disk player of FIG. 1 immediately after a disk is loaded in accordance with a sixth embodiment of the invention.
Figure 14:
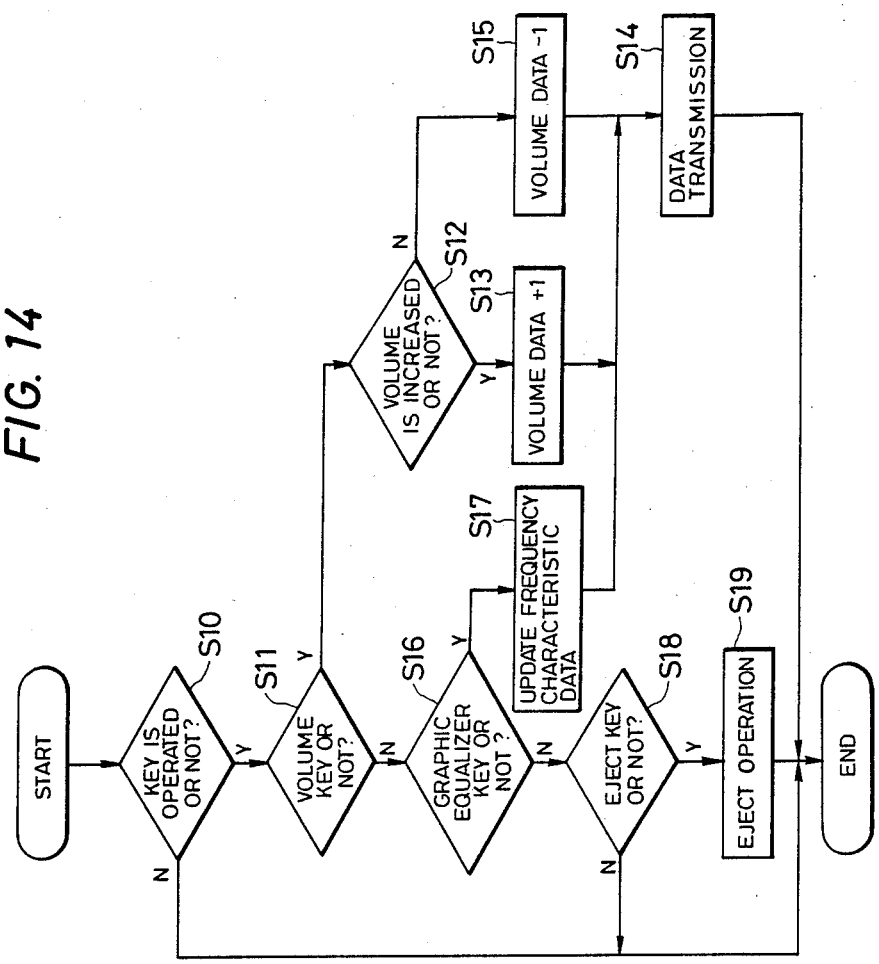
FIG. 14 is a flowchart indicating the operation of the disk player of FIG. 1 when the keyboard is operated.

Referring to the flowcharts of FIGS. 13 and 14 operations of the processor in the system controller 20 in accordance with a sixth embodiment of the invention will subsequently be described.

When an output of the sensor is received indicating the fact that one of the disks $D_1$–$D_n$ contained in the magazine 1 has been carried and clamped onto the turntable 4 while the main routine is being executed, the processor proceeds to STEP S1 and reads disk identifying data, such as a catalogue number recorded on a disk $D_n$, and stores the data at a respective address M, in the RAM 26. Subsequently, the processor proceeds to STEP S2 and, on comparing the disk identifying data stored at the address $M_1$ of the RAM 26 with disk identifying data stored in a predetermined area, determines whether or not the data recorded on the disk $D_n$ has yet been played.

If it is determined that the data recorded on the disk $D_n$ has been replayed once in STEP S2, the processor proceeds to STEP S3 and computes from the disk identification data of the disk $D_n$ an address value at which data on the disk $D_n$ is stored. Subsequently, the processor proceeds to STEP S4 and reads the address corresponding to the disk identifying data, i.e., data indicative of volume and frequency characteristics stored at an address corresponding to the address value computed in STEP S3. Then the processor proceeds to STEP S5, controls the gain and frequency characteristics of the amplifier 18, and restarts executing the routine which it was executing immediately prior to proceeding to STEP S1.

If it is determined that the data recorded on the disk $D_n$ has never been replayed in STEP S2, the processor proceeds to STEP S6, stores the disk identifying data of the disk $D_n$ in the predetermined area of the RAM, and restarts executing the routine which it was executing immediately prior to proceeding to STEP S1.

Due to the interruption of a timer or the like during the execution of the main routine, the processor proceeds to STEP S10 and determines whether or not keyboard entry through the operating unit 21 has been effected. If no keyboard entry is detected in STEP S10, the processor proceeds to STEP S10 and restarts executing the routine which it was executing immediately prior to proceeding to STEP S10. If a keyboard entry is found in STEP S10, the processor proceeds to STEP S11 and determines whether or not a volume key has been in the operating unit 21.

If the volume key is found to have been operated in STEP S11, the processor proceeds to STEP S12 and determines whether or not an instruction has been issued through the volume key to increase the loudness. If an instruction to increase the loudness is found in STEP S12, the processor proceeds to STEP S13 and adds 1 to the volume data stored at the address of the RAM 26 corresponding to the disk identifying data stored at the address $M_1$ of the RAM 26. Subsequently, the processor proceeds to STEP S14, controls the amplifier in accordance with the volume and frequency characteristics stored at the address of the RAM 26 corresponding to the disk identifying data stored at the address $M_1$ of the RAM 26, and restarts executing the routine which it was executing immediately prior to proceeding to STEP S10.

If no instruction is given to increase the loudness in STEP S12, the processor proceeds to STEP S15, subtracts 1 from the volume data stored at the address of the RAM 26 corresponding to the disk identifying data stored at the address $M_1$ of the RAM 26, and proceeds to STEP S14.

If the volume key is not operated in STEP S11, the processor proceeds to STEP S16 and determines whether or not a graphic equalizer has been operated. If the graphic equalizer is found to have been operated in STEP S16, the processor proceeds to STEP S17, updates the frequency characteristic data at the address of the RAM 26 corresponding to the disk identifying data stored at the address $M_1$ of the RAM 26, and proceeds to STEP S14. If the graphic equalizer is not operated in STEP S16, the processor proceeds to STEP S18 and determines whether or not an eject key has been operated.

If the eject key is found to have been operated in STEP S18, the processor proceeds to STEP S19, issues instructions to the driving circuits 24, 25 so that the disk $D_n$ is released and carried back into the magazine 1, and restarts executing the routine which it was executing immediately prior to proceeding to STEP S10. If the eject key is not operated in STEP S18, the processor instantly restarts executing the routine which it was executing immediately prior to proceeding to STEP S10.

With the aforesaid operations, when the keyboard of the operating unit 21 is operated to, for instance, adjust the volume, adjusted volume data or the like are stored at the address of the RAM 26 corresponding to the disk identifying data stored at the address $M_a$ of the RAM 26, i.e., the disk identifying data of the disk clamped on the turntable 4. Accordingly, provided the data of the present disk has been previously stored, the data corresponding to the volume adjustment at the time of replaying the data recorded on the disk thus replaced is stored at the address of the RAM 26 corresponding to the disk identification data, and because the playing characteristics such as the volume adjustment are set by means of the data stored at the address of the RAM 26 corresponding to the disk identification data, playing characteristics according to the user's preference are automatically obtained, which makes unnecessary manual operations for adjusting the playing characteristics. The overall operability of the player is thus improved.

In the method for setting playing characteristics in a disk player according to this embodiment of the present invention, disk identifying data recorded on the recording disk loaded in the play position of the disk player is read when play characteristics are initially manually adjusted, the adjusted value of the playing characteristics is stored in a storage position in the storage unit corresponding to the disk identifying data thus read, the disk identifying data of the recording disk loaded in the playing position of the disk player is read, and the playing characteristics are set by means of the adjusted value of the playing characteristics stored in the storage position in the storage unit corresponding to the read-out disk identifying data. Accordingly, if the data recorded on a disk has previously been played, playing characteristics according to the user's preference are automatically obtained corresponding to the disk identifying data after replacement, and therefore the overall operability of the player is improved.

What is claimed is:

1. A playback method for a multidisk player having means for holding a plurality of disks, each of the disks having recorded thereon identifying data which uniquely identifies that disk, the method comprising the steps of:

selecting one of the disks for playback;

reading and storing the identifying data recorded on the selected disk;

playing back information recorded on the selected disk;

storing, in a location corresponding to the stored identifying data of the selected disk, information representing playing characteristics of the player which are manually adjusted by a user during playback of the selected disk, whereby the information representing the manually adjusted playing characteristics of the player is used for controlling the player during subsequent playback of the selected disk.

2. The playback method according to claim 1 further comprising the steps of:

subsequently re-selecting the selected disk for playback;

reading the identifying data recorded on the selected disk;

reading the stored information representing the playing characteristics of the player which correspond to the read identifying data of the selected disk;

adjusting the playing characteristics of the player according to the read playing characteristics; and playing back information recorded on the selected disk.

* * * * *